4 Sheets—Sheet 1.

H. W. PUTNAM.

Machine for Making Barbed Fence Wires.

No. 9,485. Reissued Nov. 30, 1880.

Witnesses,

Edward L. Swift

W. A. Rodh

Inventor,

Henry W. Putnam

H. W. PUTNAM. 4 Sheets—Sheet 2.

Machine for Making Barbed Fence Wires.

No. 9,485. Reissued Nov. 30, 1880.

Witnesses.

Edward L. Swift

W. A. Rose

Inventor:

Henry W. Putnam

4 Sheets—Sheet 3.

H. W. PUTNAM.

Machine for Making Barbed Fence Wires.

No. 9,485. Reissued Nov. 30, 1880.

Witnesses,

Edward L. Swift

W. A. Roch

Inventor,

Henry W. Putnam

4 Sheets—Sheet 4.
H. W. PUTNAM.
Machine for Making Barbed Fence Wires.
No. 9,485. Reissued Nov. 30, 1880.
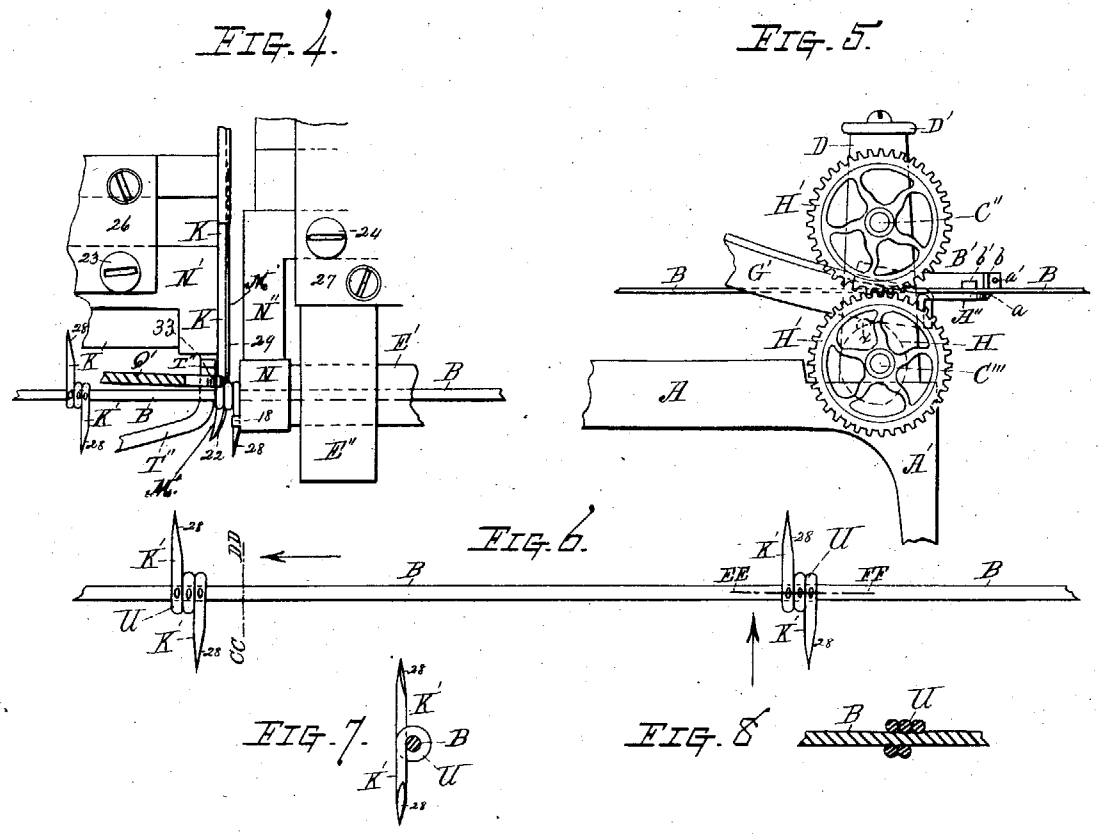
Witnesses,
Edward L. Swift
W. A. Roe
Inventor,
Henry W. Putnam

UNITED STATES PATENT OFFICE.

HENRY W. PUTNAM, OF BENNINGTON, VERMONT.

MACHINE FOR MAKING BARBED FENCE-WIRE.

SPECIFICATION forming part of Reissued Letters Patent No. 9,485, dated November 30, 1880.

Original No. 173,667, dated February 15, 1876, Application for reissue filed October 12, 1880.

*To all whom it may concern:*

Be it known that I, HENRY W. PUTNAM, of Bennington, in the county of Bennington and State of Vermont, have invented certain new and useful Improvements in Machines for Making Barbed Fence-Wire or Fencing; and I do hereby declare that the following is a full, clear, and exact description of the same, reference being had to the accompanying drawings, forming a part of this specification, in which—

Figure 1:
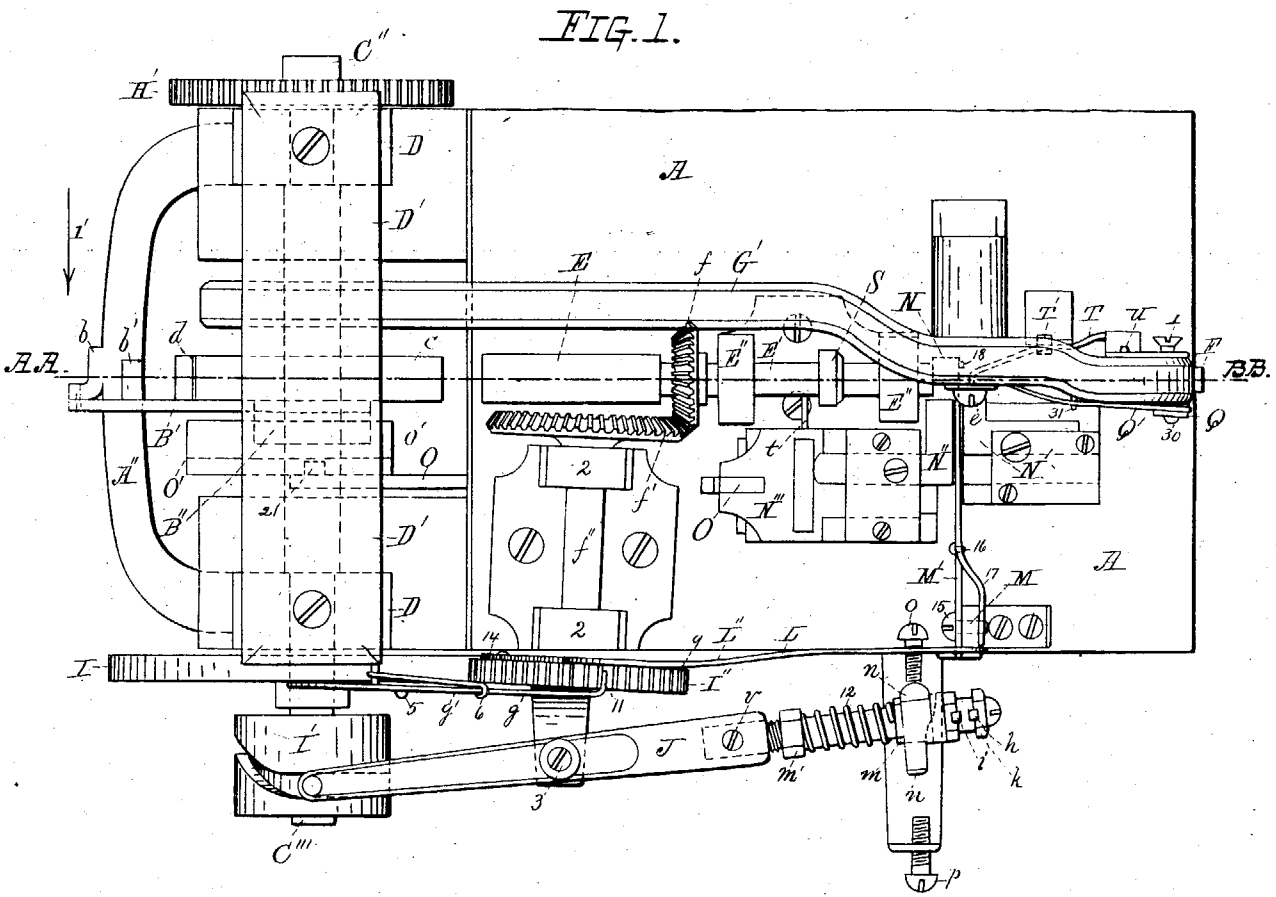
Figure 2:
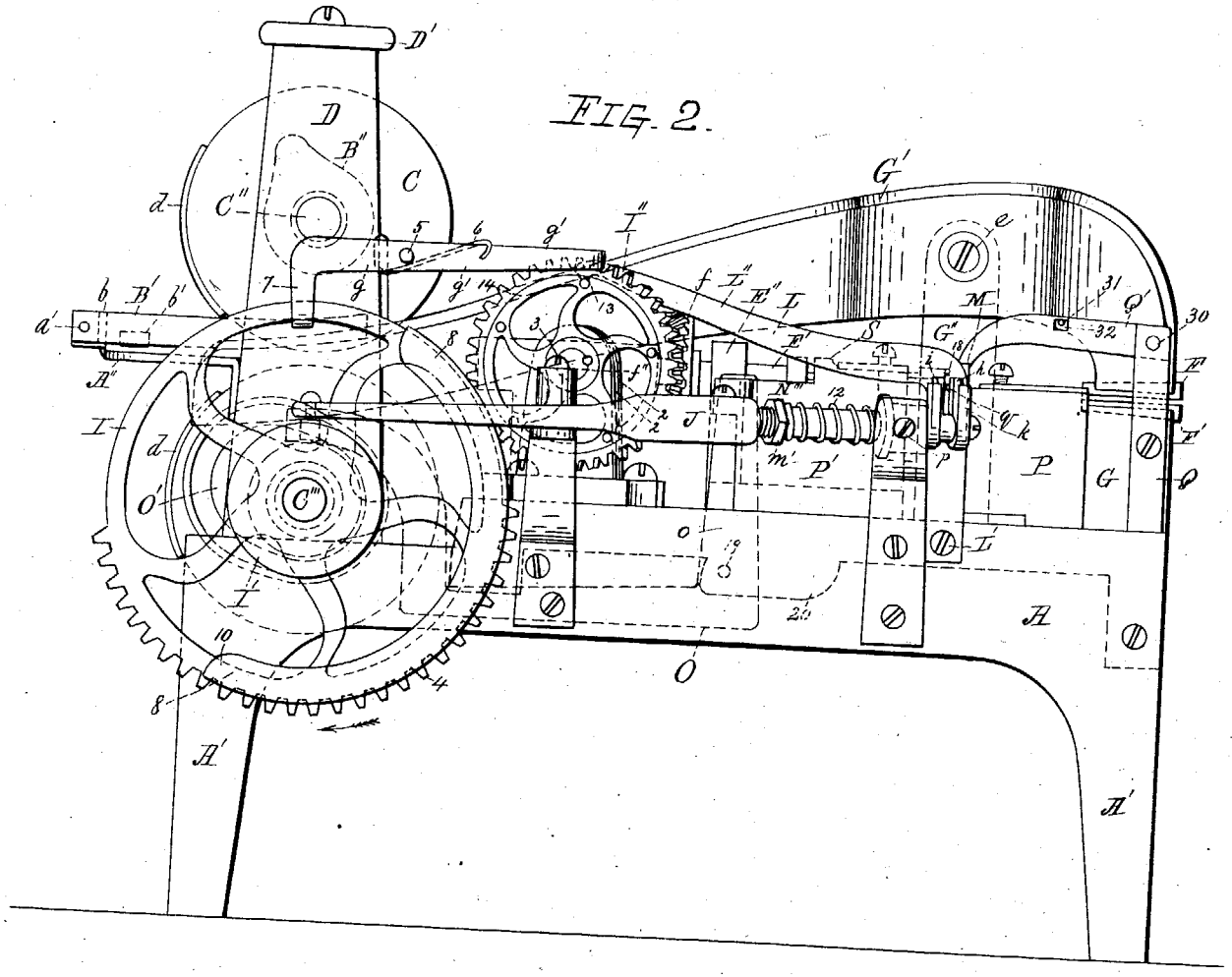
Figure 3:
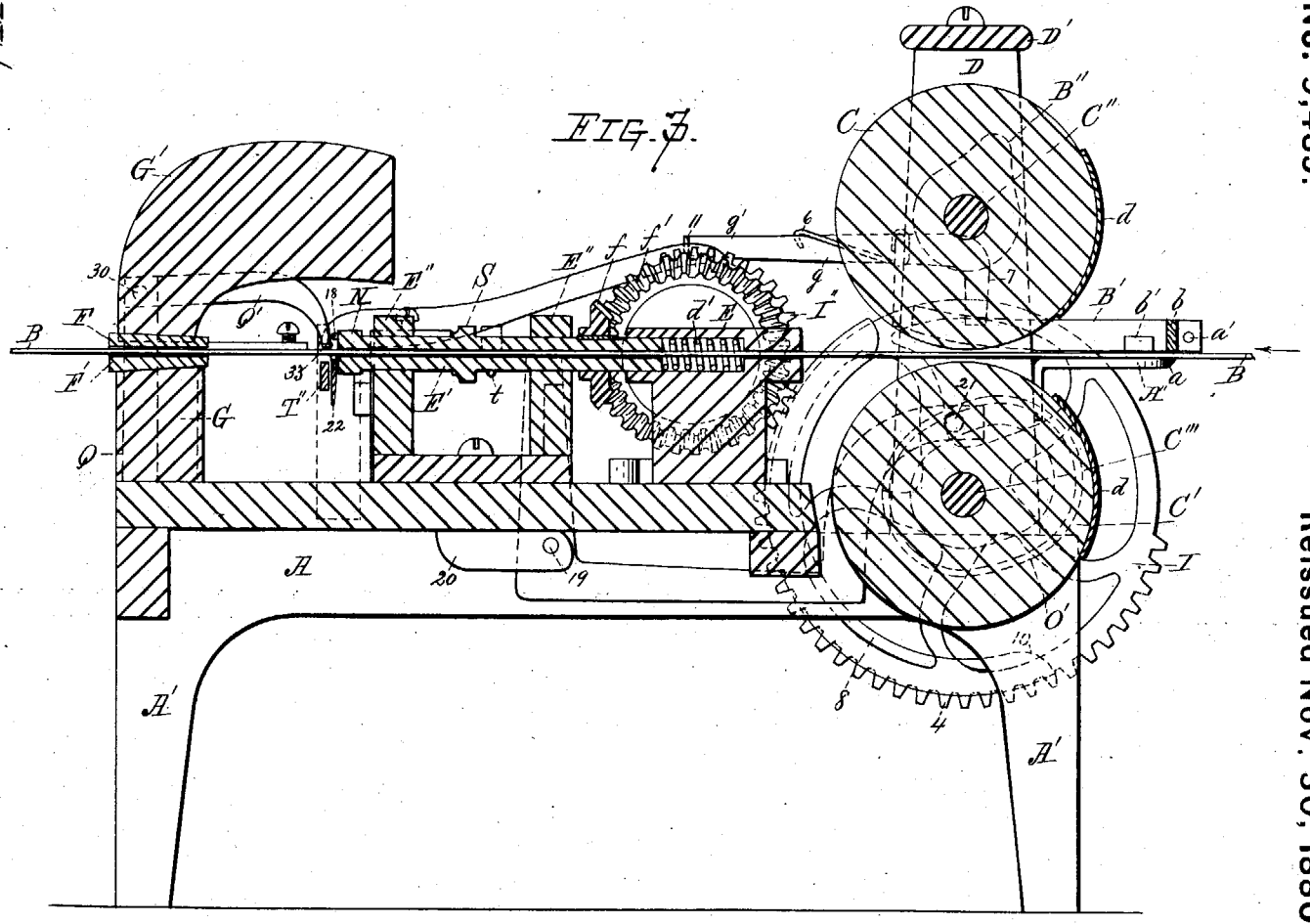

Figure 1 represents a top or plan view of my said improved machine. Fig. 2 represents a side view. Fig. 3 represents a vertical central section on line A A B B, Fig. 1, looking in the direction of arrow 1', Fig. 1, and consequently the machine appears turned end for end. Fig. 4 represents, upon an enlarged scale, a top or plan view of a section of the machine, as will be hereinafter explained. Fig. 5 represents a side view of a section of the rear portion of the machine, looking in the direction of arrow 1', Fig. 1, as will be hereinafter explained. Fig. 6 represents, upon an enlarged scale, a top or plan view of a section of the barbed wire or fencing made by my said machine, the section showing four of the barbs in position upon the main wire as they are left by the machine. Fig. 7 represents a cross-section of the barbed wire or fencing on line C C D D, Fig. 6; and Fig. 8 represents a longitudinal section of the barbed wire or fencing on line E E F F, Fig. 6.

To enable those skilled in the art to which my invention belongs to make and use the same, I will proceed to describe it more in detail.

In the drawings, the part marked A represents the main frame, which is of rectangular form, and supported upon four legs, A', one at each corner of the machine. Said frame may be made and supported in any suitable manner, although differing from what is shown in the drawings.

B represents the main wire, upon which the barbs are to be wound, as will be hereinafter explained. This main wire B may be fed into the machine from a coil or reel, and passes directly through the machine, as indicated in Figs. 3, 4, and 5, the main and cross wires not being shown in Figs. 1 and 2. The main wire is first passed through an opening or hole, *a*, in the projection *b* on the stand-piece A'', and under the clamping-arm *b'* on the lever B', which is pivoted at *a'* to one angle on the projection *b*. The wire is then passed between the feed-rolls C C' upon shafts C'' C''', which turn in suitable bearings in the standards D D, one on each side of the machine, said standards being connected by a top plate, D'.

The peripheries of feed-rolls C C' are so made and arranged as not to come in contact with the main wire B only when certain portions of their peripheries come opposite to each other—viz., those portions marked *d d* in the drawings—and which portions project out beyond the other portions of the peripheries of said feed-rolls, as fully indicated in the drawings.

The main wire passes through a hole in the end of a stationary bearing-piece, E, in which is arranged a spiral spring, *d'*, and through which spiral spring the wire passes forward, and thence through a hole in the center of the rotating and barb-winding shaft E', which turns in bearings E'' E'', one end projecting into the rear end of the stationary bearing-piece E and abutting against the spiral spring *d'*, as indicated in Fig. 3. The wire then passes forward and through the compressing-jaws F F', the latter jaw, F', being provided with a groove, into which the lower edge of the main wire B projects slightly, while the face of the upper jaw, F, has a plane surface. These jaws are made inclined upon their outer edges to fit corresponding inclined grooves formed one in the top of the stationary base-piece G, and the other in the face of the barb-compressing lever G', which lever is pivoted or fulcrumed at *e* in the standard G'', the rear end of lever G' projecting forward and resting upon cam H, which is securely fastened on shaft C'''.

Jaws F F' may be held in place by keys or set-screws 1, and by making said jaws wedge shape upon their outer edges, as shown in Fig. 3, by adjusting them in or out a greater or less space may be obtained between their faces, which will always remain parallel to each other.

Shafts C'' C''' are geared together by means of the cog-gears H' H'. Consequently the relative motions of the feed-rolls C C' will always be found in unison, and the action of compressing-lever G' will always be at a given point in the rotation of said feed-rolls and cam H, which moves with feed-roll C′.

From the foregoing description it will be seen that the main wire B will be fed forward a given distance at each rotation of the feed-rolls C C′, the distance at which said main wire will be fed being equal to the length of the projecting parts *d d* upon the peripheries of said feed-rolls; and in practice I prefer to make said projecting parts *d d* of steel, and have them slightly grooved to fit the main wire properly.

Shaft E′ is provided with a bevel-gear, *f*, which meshes into a bevel-gear, *f′*, on shaft *f″*, turning in bearings 2 2. Bevel-gear *f* is not keyed to shaft E′, but has a slot into which a spline on shaft E′ fits. Consequently, while shaft E′ is rotated by means of the gears *f f′* it can move longitudinally as the barb-wire is wound upon the main wire, as will be hereinafter explained. Upon the opposite end of shaft C″ from gear H′ is fastened a skeleton cam gear-wheel, I, and outside of that upon the main shaft a cam-wheel, I′, the latter operating the barb-wire-feeding lever J, which is pivoted at 3, and whose action will presently be described.

It will be noticed that cogs 4 on cam gear-wheel I extend only a part way around. Consequently, as gear I″ on shaft *f″* is driven by the cogs 4, shaft *f″*, bevel-gears *f′* and *f* are at rest, as well as shaft E′, during about one-half of each revolution of the feed-rolls C and C′, and it is during this time that the main wire is fed forward the proper distance, and also the barb or cross wire is also fed forward the desired length necessary to form the coils about the main wire and the barb on one side of the same.

To prevent gear I″ from moving out of place after cogs 4 have moved out of mesh with its teeth, a locking-lever, *g*, is pivoted at 5, and is pressed down by a spring, 6. Said lever *g* is provided with a hooked end, 7, which extends under the edge of the cam part 8 on wheel I, whereby, when cogs 4 begin to take into teeth 9 on gear I″, the beveled end 10 of cam 8 runs over the bent or hooked end 7 of lever *g* and raises the long arm *g′* thereof, thereby releasing the bent end 11 from the teeth 9, thus leaving gear I″ free to move; but as soon as cogs 4 cease to act on gear I″ the hooked end 7 is released from cam 8, and spring 6 instantly depresses the long arm of the lever and locks gear I″, as shown in Figs. 1 and 2.

The barb or cross wire is fed from a roll or reel as follows: The end of the wire is passed between the jaws *h* and *i*, jaw *h* being held in a rigid finger, *k*, fastened to the end of feed-lever J, while jaw *i* is fastened to a finger on the movable sleeve-piece *m*, fitted to work back and forth on feed-lever J, a spiral spring, 12, being arranged between the sleeve-piece and an adjusting-nut, *m′*, on said lever. Spring 12 tends to force jaw *i* against jaw *h*, and keeps up close to it only when jaw *i* is forced back by the action of a movable wedge, *n*, fitted to slide back and forth through slots in both the sleeve-piece *m* and in the end of the feed-lever J. Wedge *n*, as lever J is vibrated back and forth, is forced alternately against the ends of the adjusting-screws *o* and *p*, which pass through suitable stands secured to the main frame. The form of wedge *n* and the slot in the lever J are shown in full and dotted lines, Fig. 1.

When the parts are in position shown in Fig. 1 the head of wedge *n* is acted upon by coming in contact with the point of screw *o*, and sleeve-piece *m* is forced back, thereby opening the jaws *h* and *i*, while, when lever J moves in the opposite direction, the point of the wedge will come in contact with the point of screw *p*, and the wedge will be driven in the opposite direction or out of the slot, when spring 12 will instantly force sleeve-piece *m* forward and close the jaw. The form of the inclined side of wedge *n* is such that the action of spring 12 will cause the wedge to move very quickly after it has been driven most out by screw *p*.

The cross-wire K, to form the barbs K′ K′, passes between the jaws *h* and *i*, and is by them fed through a hole, *q*, in the angular lever L, hinged at L′ to the main frame, while its long arm L″ has a rounded projection, which drops into a corresponding depression in the circular flange 14 on the inside of the gear I″ whenever said gear is locked by lever *g*, as shown in Figs. 1 and 2.

M is a standard, against the edge of which the side of lever L works, so that when the projection 13 on lever L drops into the depression on circular flange 14, as shown in Figs. 1 and 2, the cross-wire which passes through the hole *q* will not come in contact or be bound against standard M, but will be so bound whenever gear I″ is moved so as to raise projection 13 upon the periphery of said flange, which is on a line, or nearly so, with the base of teeth 9 on gear I″.

The cross-wire, after passing through hole *q* in lever L, is run forward over an inclined arm, M′, hinged at 15 and resting upon an adjusting-screw, 16. Above this inclined arm M′ is a spring-arm, 17, the rear end of which is fastened to standard M, and the cross-wire passes between the upper edge of inclined arm M′ and lower edge of spring-arm 17. It is then run forward and passed above the main wire B and under a projecting finger, 18, in the head N of shaft E, and when in this position it will pass up between the cutters N′ N″, the former being stationary and the latter secured to a sliding head, N‴, operated by the vertical arm of the lever O, which is pivoted at 19 to a leg or projection, 20, on the under side of the machine. The rear end of the lever O is bent up and extended forward, and is provided with a pin, 21, which fits into a groove in the side of a cam-wheel, O′, fast upon shaft C″, as indicated in dotted lines, Figs. 1, 2, and 3, and the form of the groove in cam-wheel O′ is such as to give the necessary forward motion to cutter N″ at the proper time for cutting off the cross-wire after its end has been wound around the main wire the desired number of times, and in practice I have found that twice around the main wire and partly around the third time, as shown in Figs. 4, 6, and 8, will generally be sufficient. In this instance inclined arm M extends forward under and beyond the main wire B and terminates with a curved point, 22. The object of this curved point or guide is to give the end of the cross-wire, when first acted upon by finger 18, a back spiral motion as it is being wound about the main wire to form the first coil thereon. In lieu, however, of this arrangement, a separate guide-piece, 22, may be employed, said guide-piece being secured to some permanent part of the frame of the machine.

The cutters N′ and N″ are secured by means of set-screws 23 and 24, respectively, said set-screws passing through plates 26 and 27. (See Figs. 1 and 4.) Cutter N′ rests in a slot or recess formed in the top of stand P, while cutter N″ rests in a slot or recess formed in the top of the movable head N‴, which is fitted to move back and forth on the top of stand P′ as lever O is operated, the joint between sliding head N‴ and the top of stand P′ being hidden from view in Fig. 2 by lever J. Sliding head N‴ is retained in its proper relative position as it works back and forth upon the top of stand P′ by suitable guides combined with its lower side and the top of stand P′; but, as these guides are of ordinary construction in all cases where it is desired to retain a moving part from lateral motion when moving back and forth, no further description is here necessary.

By turning screw 16, which rises up from the main frame and supports inclined arm M′, the outer end, 22, of said arm can be raised or depressed, as the case may be, thereby elevating or lowering the cross-wire K at the point where it passes up between the cutters N′ and N″, since said wire rests upon the upper edge of said arm, just under the cutters, whereby said wire can be fed to or supported so that the cutters will cut off the wire at a greater or less angle, 28.

If desired, the upper edge of arm M′, under the cutter, or between the cutter and center of shaft E,′ may be formed with a slight groove or depression, into which the lower edge of the cross-wire can rest, thereby retaining it more securely in position while its end is being wound around the main wire. In this instance said inclined arm M′ is beveled off on its edge next to cutter N′, so that said wire rests or is held in place between the end of stationary cutter N′ and flange or beveled edge 29 of arm M′.

If it is desired to make a short cut or bevel, 28, for the barbs K′ K′, then the outer end of inclined arm M′ is raised; but if it is desired to increase the length of the bevel or cut 28, then the outer end of said arm is lowered.

A standard, Q, is secured to the side of the block or anvil-piece G, which supports the lower die, F′, and to the upper end of said standard Q is hinged at 30 one end of lever Q′. The other end of said lever, which is bent down and provided with a foot adapted to rest and press upon the cross or barb wire K, between the cutter and the main wire B, is operated by a pin, 31, which projects from the side of lever G′, and passed through a slot, 32, in said lever Q′, and from which arrangement it will be seen that the foot 33 of lever Q′ will be forced down upon said cross-wire when the head of lever G′ is depressed, and vice versa.

Shaft E′ is provided with a flange or hub, S, while sliding head N‴ is provided with a projecting pin, *t*, whereby, when said sliding head is moved forward to cut off the cross-wire K, pin *t* will strike against hub S and move said shaft E′ forward to its proper position to pass the finger over the end of cross-wire K should said spring *d*′ at any time fail to force said shaft forward when the main wire B is fed forward after the cross-wire has been coiled about it, as shown in Fig. 4.

Lever B′ is forced down by means of cam B″, (shown in dotted lines, Figs. 1, 2, and 3,) whereby said lever is caused to press, by means of its lug or finger *b*′, upon the main wire B with increased force at the time when the cross-wire is being fed over the main wire, and also when finger 18 on head N of shaft E′ commences to coil the barb-wire about the main wire; but said lever B′ is released from the pressure of said cam before the feed-rolls C C′ commence again to feed forward the main wire.

In case it is desired to coil the barb-wire around two or more main wires, then a supporting-lever, T, is hinged to a standard, T′, upon the main frame, with its rear end provided with a slot to receive a projecting pin, *u*, in the head of lever G′, so that when said head is depressed the end T″ of lever T will be elevated to support said main wires, and thereby prevent one from being twisted around the other when the barb-wire is coiled around them by finger 18. When, however, a single main wire is used, lever T may be dispensed with.

If preferred, the faces of both the dies F and F′ may be made smooth, or they may be grooved or corrugated as found most effective in practice.

By arranging the foot 33 of lever Q′ so that it will be depressed down by means of lever G′ to bear firmly upon the cross or barb wire between the cutters and the main wire, as indicated in Fig. 4, (which figure represents, upon an enlarged scale, a plan view of a portion of the coiling and cutting-off mechanism,) the cross-wire can be wound far more tightly and compactly about the main wire than it would be without said lever.

As the barbed wire is delivered from the machine it can be wound upon a reel, by power or otherwise, in a convenient form for storage or transportation. Then, again, as the barbed ends project in the same horizontal plane, or nearly so, and are always upon the same side of the main wire for its whole length, the barbed fence-wire can be wound upon and unwound readily from the reel without liability of the barbed ends of one strand catching into the other strands, since each set of barbed ends will be separated from those under them by the diameter of the main wire added to that of the barb-wire.

As the barbed wire leaves the machine it may be given one or more twists, when two or more main wires are used, before it is wound upon the reel, the twists being made between the various sets of barbs or groups.

The barbed ends can be made to stand in the same relative position as they do when the wires are not twisted, and consequently the barbed wire can be wound up and unwound as readily as if not twisted.

When a single main wire is used I prefer that it should be No. 9, and the cross or barb wire No. 12. Of course the size of both wires may be varied to suit the particular use to which the fence-wire is to be applied.

It will be understood that the parts of the machine may be modified and made somewhat differently than what is shown in the drawings without departing from the principle of my invention, one good way of applying the same to practical use being shown and described therein.

Referring to the feed-arm J, the outer end, upon which the spiral spring 12 and nut *m'* are placed, is made separate from the other end, the former part being slipped into a socket in the latter, and there held by a set-screw, *v*, and by moving the said detachable part out or in the feed can be increased or shortened, as occasion may require.

The gripe of jaw *i* upon the cross-wire can be regulated by nut *m'*, since by screwing the nut out toward the spring its pressure will be greater upon the jaw, and vice versa. The feed-jaws may also be arranged to move back and forth in a direct line when a long feed is required, in which case the feed-lever could have a lug fitting into a slot in the sliding jaw-frame, or vice versa. Still, again, the feed-lever may be provided with a shifting fulcrum for adjusting the throw of the feed-jaws.

Screw *p* is so arranged that it will force wedge *n* back and allow spring 12 to close the jaw upon the barb-wire just before lever J reaches its utmost outer throw, thereby slightly withdrawing the wire from the cutters N' N'', and by which operation cutter N'' does not drag in contact with the wire when it is withdrawn. Consequently its edge remains unimpaired for a long time, and it therefore makes a much cleaner and sharper cut than it would if the barb-wire were not withdrawn slightly after each cut and before the cutter N'' was withdrawn.

A practical test has shown that unless the barb-wire is retracted, as above stated, it soon wears off the lower corner or edge of cutter N''. Consequently this is a very important feature of the invention, since it insures such a perfect cut that the pointed ends of the barbs are almost as effective as needle-points, which is very desirable in a barbed fence-wire.

The ends of the cutters N' N'' may be made to incline down slightly toward the main wire, whereby there will be less liability of the cross-wire slipping from the action of the cutter. Then, again, the feeding mechanism may be made to have the barbs stand at a greater or less distance apart upon the main wire.

The operation of the machine may be briefly stated or summed up thus: The machine is turned until the portions *d d* of the feed-rolls C C' almost come together upon the main wire, when the latter is fed or pushed along until its end is a little past the cutters; then the cross or barb wire is fed in until the end reaches to about one-half of an inch of the main wire; then the machine is set in operation by power applied to shaft C''' in any well-known manner, and the feed-rolls C C' feed the main wire B along some five inches, making about one-quarter of a revolution in the operation. The main wire is now at rest, and about an eighth of a revolution more carries the barb-wire, by means of the action of feed-lever J and its jaws *h* and *i*, over the main wire sufficiently far to form the coil M and one barb end, K', the main wire being held firmly at rest by the closing of the dies F F' and the action of cam B'' on lever B', as before explained. As the machine continues in operation the end 10 of cam 8 forces down the end 7 of lever *g* and releases gear I''. At the same time cogs 4 on wheel I have reached the cogs 9 of gear I'' and set the latter in operation, thereby communicating a rotary motion to shaft E' and finger 18 on head N, whereby finger 18 is forced down upon the barb-wire, bending the end, which projects over the main wire down and around the latter until the barb-wire comes in contact with the curved guide 22, which gives to it a back spiral direction around the main wire, so that when it comes up on the inner side it will not strike against the barb-wire between the cutters and the main wire, but will be carried between it and cutter N'', shaft E' receding as the barbed wire is wound around the main wire.

Fig. 4 represents the end of the barbed wire wound around the main wire ready to be cut off by the cutter N'' at its next forward motion. As soon as finger 18 reaches to the point shown in Fig. 4, the coil M being completed, the gear I'' is locked again, and the main wire and cross-wires are released from the action of the levers B' and L, respectively, when the cutter N'' being moved forward it cuts off the cross-wire a sufficient distance from the coil to leave the barb K' on that side. By the time the cutter N'' commences to cut the wire K the feed-rolls have commenced to feed forward the main wire B at about the same speed at which the cutter moves. Consequently the main wire and coil M, and its barbs K′ K′, move forward together until a sufficient length of wire B has fed forward to receive another coil, which is formed as before explained.

The jaws or dies F F′ are so arranged that when the main wire stops after a coil has been formed the newly-formed coil will be between said jaws or dies, whereby when the head of the compressing-lever G′ descends the coil will be clamped between the dies F F′, which hold the same quite firmly until just before the cutter N″ moves forward and cuts off the barb-wire, when the small projection *x* on cam H causes lever G′ to force down its die F with great power upon the coil M, so much so as to flatten the sides of the coils, as shown in Figs. 6, 7, and 8 of the drawings. The power is also so great as to force the coils into the main wire, as indicated in Fig. 8. By this compression the coils are firmly secured to the main wire, so that it is with great difficulty that they can be turned upon the main wire, except with a strong wrench-lever.

As before explained, when feed-lever J moves back to take a new hold upon the cross-wire K it, at the last of its motion, withdraws the wire, thus preventing the cutter N″ from dragging upon it when moving back after having cut off the wire. By adjusting screw *p* in or out the wire can be withdrawn more or less, if desired.

It will be seen that the hollow shaft E′ stops at a point just after the finger 18 has moved over the center of the shaft. Consequently when the end of the cross or barb wire is fed forward above the main wire to form the next barb it passes under the finger and is in the proper position to be acted upon by the finger when shaft E′ is put into motion.

It will be observed that by my invention barbed fence-wire or fencing can be produced in a continuous and rapid manner, while all the coils and barbed ends are of a uniform shape and size.

Having described my improvements in machines for making barbed fence-wire or fencing by a continuous operation, and that, too, by mechanism operating automatically, what I claim therein as new and of my invention, and desire to secure by Letters Patent, is—

1. In a machine for making barb fence-wire by a continuous operation, the combination of the following elements or organisms, viz: mechanism constructed and arranged to automatically feed forward the main fence-wire at stated intervals, mechanism constructed and arranged to automatically feed forward the barb-wire across the main fence-wire at stated interval, mechanism for coiling the barb-wire about the main wire, and mechanism for cutting off the barb-wire, substantially as heretofore set forth.

2. In a machine for making barb fence-wire by a continuous operation, the combination, with mechanism constructed and arranged to automatically feed forward the main wire at stated intervals, and mechanism constructed and arranged to automatically feed forward the cross or barb wire across the main wire at stated intervals, of mechanism for coiling the barb-wire about the main wire, and mechanism for cutting off the barb-wire, and for fastening the coil barb-wire to the main wire, in connection with guides for the wire, substantially as described.

3. The combination of the rotating and reciprocating mechanism for coiling the barb-wire about the main wire with mechanism for supporting the main wire and mechanism for supporting the barb-wire, substantially as described.

4. The combination, with the feed-rolls C C′, provided with the feeding-projections *d d*, of cam B″ and lever B′, provided with holding-finger *b*′, for the purposes stated.

5. The combination, with the hollow rotating and reciprocating shaft E′ and reciprocating head N‴, of the projecting pin *t* and shoulders S, substantially as and for the purposes set forth.

6. The combination, with the hollow rotating and reciprocating shaft E′ and hollow stationary bearing and main-wire guide E, of spring *d*′, substantially as and for the purposes set forth.

7. The combination, with the hollow shaft E′ and finger 18, for coiling the barb-wire, of lever Q′, for holding the uncut part of the barb-wire, substantially as described.

8. The combination, with the hollow rotating and reciprocating shaft E′ and coiling-finger 18, of the curved guide 22, arranged to give the end of the barbed wire when first acted upon by said finger a spiral motion in the direction of the endwise movement of said hollow shaft in coiling the barbed wire, substantially as described.

9. The combination, with compressing-lever G′, of double main-wire supporting-lever T T″, substantially as and for the purposes set forth.

10. The combination, with compressing-lever G′ and supporting-stand G, of the inclined adjustable dies F F′, substantially as and for the purposes set forth.

11. The combination, with hinged lever M′, of adjusting-screw 16, substantially as and for the purposes set forth.

12. The combination, with levers Q′ and M′, for supporting the barb-wire K, of the cutters N′ N‴, for severing or cutting the wire to form the bevels or barb-points 28, substantially as described.

13. The combination of holding-lever B and holding and compressing lever G′, of cam B″, and cam H *x*, substantially as and for the purposes set forth.

14. The combination, with barb-wire supporting-lever M′, of spring-arm 17, and flange or guide 29, substantially as and for the purposes set forth.

15. The combination, with shafts C‴ and *f*″, of cog-gear I″ and cam and blank face gear I, and of locking-lever *g*, substantially as and for the purposes set forth.

16. The combination, with the recess-flange 14, of gear I″ and stationary stand M, and of the hinged barb-wire holding-lever L, substantially as and for the purposes set forth.

17. The combination, with the barb-wire feeding and retracting lever J, provided with jaws *h* and *i*, one or both movable, of the adjusting-screws *o* and *p* and wedge *n*, substantially as and for the purposes set forth.

18. The combination, with the cutters, in a machine for feeding and cutting off wire beveled or pointed, as shown at 28, of retracting mechanism whereby the wire is slightly withdrawn before the cutter moves back, for the purposes stated.

19. The combination of lever J and cam I′, of adjusting-screw *m*′, spring 12, sliding head *m*, stationary head *k*, and of the movable wedge *n*, substantially as and for the purposes set forth.

20. The combination, with feed-rolls C C′, of cams B″ O′ H *x* and levers G′, B′, and O, substantially as and for the purposes set forth.

21. The adjustable feed-lever J, constructed and operating substantially as and for the purposes set forth.

22. In a machine for making barbed fence-wire, the combination of the following elements, viz: first, mechanism for properly supporting and feeding the main wire; second, mechanism for properly supporting and feeding the barb-wire; third, rotating and reciprocating mechanism for coiling the barb-wire about the main wire, substantially as described.

23. The mode or process of forming barb-wire fence by a continuous operation by feeding at stated periods the barb-wire across the main wire, coiling the former around the latter, and cutting the barb-wire, said operations being performed successively and continuously, substantially as shown and described.

HENRY W. PUTNAM.

Witnesses:
EDWARD L. SWIFT,
W. A. ROOT.